US006912586B1

(12) United States Patent
Achtermann et al.

(10) Patent No.: US 6,912,586 B1
(45) Date of Patent: Jun. 28, 2005

(54) APPARATUS FOR JOURNALING DURING SOFTWARE DEPLOYMENT AND METHOD THEREFOR

(75) Inventors: Jeffrey Mark Achtermann, Austin, TX (US); Arabinda Bose, Cedar Park, TX (US); Alberto Giammaria, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/438,437

(22) Filed: Nov. 12, 1999

(51) Int. Cl.[7] .............................................. G06F 13/00
(52) U.S. Cl. ................. 709/232; 709/222; 709/224; 370/226
(58) Field of Search ................. 709/220–223, 709/232, 225, 224, 230, 238, 239; 370/216, 226, 252, 254, 501, 401, 432

(56) References Cited

U.S. PATENT DOCUMENTS

| | | | | |
|---|---|---|---|---|
| 4,523,206 A | * | 6/1985 | Sasscer .................. | 711/130 |
| 4,697,266 A | * | 9/1987 | Finley ..................... | 714/16 |
| 5,367,643 A | * | 11/1994 | Chang et al. ........... | 710/62 |
| 5,446,874 A | * | 8/1995 | Waclawsky et al. ... | 714/1 |
| 5,448,230 A | * | 9/1995 | Schanker et al. ..... | 340/870.03 |
| 5,455,934 A | * | 10/1995 | Holland et al. ........ | 435/6 |
| 5,457,683 A | * | 10/1995 | Robins .................... | 370/258 |
| 5,566,309 A | * | 10/1996 | Ishida ..................... | 710/309 |
| 5,572,678 A | * | 11/1996 | Homma et al. ........ | 709/227 |
| 5,586,256 A | * | 12/1996 | Thiel et al. ............. | 710/100 |
| 5,590,124 A | * | 12/1996 | Robins .................... | 128/836 |
| 5,680,602 A | * | 10/1997 | Bloem et al. ........... | 707/1 |
| 5,701,482 A | * | 12/1997 | Harrison et al. ........ | 709/105 |
| 5,701,484 A | * | 12/1997 | Artsy ....................... | 719/316 |

(Continued)

FOREIGN PATENT DOCUMENTS

| | | | |
|---|---|---|---|
| EP | 0711088 | * | 5/1986 |
| EP | 0 192 120 | | 8/1986 |
| EP | 0192120 | * | 8/1986 |
| EP | 0 711 088 | | 5/1996 |
| EP | 0871123 | * | 10/1998 |
| EP | 0 871 123 | | 10/1998 |
| IE | 66464 | * | 4/1994 |
| JP | 7-50673 | * | 2/1995 |
| JP | 9-331323 | * | 12/1997 |
| JP | 10-303890 | * | 11/1998 |
| SU | 1741145 A2 | * | 6/1992 |
| WO | WO 97/15018 | * | 4/1997 |
| WO | WO97/38624 | | 10/1997 |
| WO | WO 97/38624 | * | 10/1997 |

OTHER PUBLICATIONS

"Error Handler Activation Procedure," *IBM Technical Disclosure Bulletin*, vol. 37 No. 08, Aug. 1994, pp. 231–232.
"Transferring Bulk Data in Message Queueing System," *IBM Technical Disclosure Bulletin*, vol. 41, No. 01, Jan. 1998, pp. 437–438.

(Continued)

*Primary Examiner*—Moustafa M. Meky
(74) *Attorney, Agent, or Firm*—Kelly K. Kordzik; Berry S. Newberger; Jeffrey S. LaBaw

(57) ABSTRACT

A method that, all-in-one, allows applications to distribute asynchronously large amounts of data from a source node to multiple destination nodes, to process that data on each single node and to collect the results of that processing on one or more report-to nodes. Distributions are given levels of priority that determine the order in which they are handled by repeaters. A distribution with a given priority can use the number of sessions reserved for its priority level plus any sessions allocated for lower priority levels. Distributions are enqueues in a persistent queue, according to its priority, for subsequent distribution and immediately returns to the caller an ID that can be used as a correlator for the results.

22 Claims, 8 Drawing Sheets

U.S. PATENT DOCUMENTS

| | | | | | |
|---|---|---|---|---|---|
| 5,724,516 | A | * | 3/1998 | Temoshenko | 709/202 |
| 5,745,783 | A | * | 4/1998 | Suzuki et al. | 710/5 |
| 5,754,763 | A | * | 5/1998 | Bereiter | 713/201 |
| 5,799,323 | A | * | 8/1998 | Mosher et al. | 707/202 |
| 5,805,920 | A | * | 9/1998 | Sprenkle et al. | 710/1 |
| 5,819,083 | A | * | 10/1998 | Chen et al. | 707/10 |
| 5,842,212 | A | * | 11/1998 | Ballurio et al. | 707/100 |
| 5,983,350 | A | * | 11/1999 | Minear et al. | 713/201 |
| 6,085,222 | A | * | 7/2000 | Fujino et al. | 709/202 |
| 6,311,216 | B1 | * | 10/2001 | Smith et al. | 709/226 |
| 6,341,311 | B1 | * | 1/2002 | Smith et al. | 709/226 |
| 6,377,991 | B1 | * | 4/2002 | Smith et al. | 709/226 |
| 6,427,172 | B1 | * | 7/2002 | Thacker et al. | 709/235 |
| 6,477,562 | B2 | * | 11/2002 | Nemirovsky et al. | 718/108 |
| 6,701,415 | B1 | * | 3/2004 | Hendren, III | 711/138 |

OTHER PUBLICATIONS

"Execution Time Dynamic Data Collection at First Detection of Failure," *IBM Technical Disclosure Bulletin*, vol. 37 No. 06B, Jun. 1994, pp. 391–392.

"'Variable Paged Array' Datatype," *IBM Technical Disclosure Bulletin*, vol. 37 No. 07, Jul. 1994, pp. 89–92.

"Distributing a Document Using a Regional Reference," *IBM Technical Disclosure Bulletin*, vol. 33 No. 3A, Aug. 1990, p. 251.

"Using Data Link Control–Level Feedback to Control Application Buffer Usage and Packet Loss," *IBM Technical Disclosure Bulletin*, vol. 41 No. 01, Jan. 1998, pp. 199–204.

"Dynamic Determination of Network Topology," *IBM Technical Disclosure Bulletin*, vol. 38 No. 03, Mar. 1995, pp. 411–418.

"Pointer Collection and Reporting for Error Recovery Procedures Branching," *IBM Technical Disclosure Bulletin*, vol. 39 No. 07, Jul. 1996, pp. 87–90.

"Hybrid Switch Control Scheme for Fast Point–to–Point/Hunt–Group Connection Setup," *IBM Technical Disclosure Bulletin*, vol. 37 No. 11, Nov. 1994, pp. 641–646.

"Flow Control of Prioritized Data in a Multimedia Communications System," *IBM Technical Disclosure Bulletin*, vol. 37 No. 01, Jan. 1994, pp. 531–532.

"Distributed Object Encapsulation of Customer Information Control System Distributed Transaction Processing," *IBM Technical Disclosure Bulletin*, vol. 38 No. 01, Jan. 1995, pp. 177–180.

"Reconciliation of Shadowed Mail Items with Master," *IBM Technical Disclosure Bulletin*, vol. 33 No. 6B, Nov. 1990, pp. 120–121.

"Riadata—An Automated Retain Incident Analysis Facility," *IBM Technical Disclosure Bulletin*, vol. 34 No. 10A, Mar. 1992, pp. 278–283.

Cao G. et al., "Low–cost Checkpointing with Mutable Checkpoints in Mobile Computing Systems," International Conference on Distributed Computing Systems, 18th Amsterdam, May 26–29, 1998, Proceedings, pp. 464–471.

Wiener, J.L. et al., "OODB Bulk Loading Revisited: the Partitioned–list Approach," International Conference on Very Large Data Bases, 21st, Zurich, Sep. 11–15, 1995, Proceedings of VLDB '95, pp. 30–41.

Muntz, D.A. et al., "Evaluating Delayed Write in a Multi-level Caching File System," IFIP/IEEE International Conference on Distributed Platforms, [Dresden, Feb. 27–Mar. 1, 1996], Proceedings: Client/Server and Beyond, pp. 415–429.

Jakoby, A. et al., "Data Transmission in Processor Networks," International Workshop on Distributed Algorithms, 9th Proceedings of WDAG '95, pp. 145–159.

Joshi, A. et al., "On Disconnected Browsing of Distributed Information," International Workshop on Research Issues in Data Engineering, 7th, Birmingham, UK, Apr. 7–8, 1997, Proceedings: High Performance Database Management for Large–scale Applications, pp. 101–107.

Saglietti, F., "Dynamic Decision on Checkpointing by Use of Reduced Ordered Binary Decision Diagrams," International Conference on Computer Safety, Reliability and Security, 16th, York, UK, Sep. 7–10, 1997, [Proceedings of] SAFECOMP '97.

* cited by examiner

APPARATUS FOR JOURNALING DURING SOFTWARE DEPLOYMENT AND METHOD THEREFOR

CROSS-REFERENCE TO RELATED APPLICATIONS

Related subject matter may be found in the following commonly assigned, U.S. Patent Applications which are hereby incorporated by reference herein:

Ser. No. 09/460,855, entitled "APPARATUS FOR DATA DEPOTING AND METHOD THEREFOR", now U.S. Pat. No. 6,772,158;

Ser. No. 09/460,853, entitled "APPARATUS FOR RELIABLY RESTARTING INTERRUPTED DATA TRANSFER AT LAST SUCCESSFUL TRANSFER POINT AND METHOD THEREFOR", now U.S. Pat. No. 6,526,447;

Ser. No. 09/438,436, entitled "APPARATUS FOR CONNECTION MANAGEMENT AND METHOD THEREFOR" and filed concurrently herewith, pending;

Ser. No. 09/458,268, entitled "COMPUTER NETWORK CONTROL SYSTEMS AND METHODS" and filed concurrently herewith, now U.S. Pat. No. 6,615,274;

Ser. No. 09/460,852, entitled "METHODS OF DISTRIBUTING DATA IN A COMPUTER NETWORK AND SYSTEMS USING THE SAME" pending Ser. No. 09/458,269, entitled "SYSTEMS AND METHODS FOR REAL TIME PROGRESS MONITORING IN A COMPUTER NETWORK, now U.S. Pat. No. 6,704,782;

Ser. No. 09/460,851, entitled "APPARATUS FOR AUTOMATICALLY GENERATING RESTORE PROCESS DURING SOFTWARE DEPLOYMENT AND METHOD THEREFOR", now U.S. Pat. No. 6,588,011; and Ser. No. 09/460,854, entitled "AN APPARATUS FOR JOURNALING DURING SOFTWARE DEPLOYMENT AND METHOD THEREFOR", now U.S. Pat. No. 6,604,237.

TECHNICAL FIELD

The present invention relates generally to data processing systems, and in particular, to bulk data distributions within networked data processing systems.

BACKGROUND INFORMATION

Present day data processing systems are often configured in large multi-user networks. Management of such networks may typically include the need to transfer large amounts data to an endpoint system from a source system (or, simply, "a source") and the collection of information, for example, error reports from a multiplicity of endpoints systems (or, simply, "endpoints").

Such large data transfers may occur within a network, for example, to distribute software updates. The system administrator may need to allocate a specific period of time for the bulk data transfer to more efficiently utilize network resources. This may typically occur when the communication load on the system is lowest, usually at night when most endpoint users are not working at their stations. The system administrator may load the bulk data and the corresponding transfer instructions onto the network system's source, or server, in preparation for the transfer. At the predetermined time set by the administrator, the server will push the data while ensuring that the bulk data is successfully transferred to each of the desired endpoint locations. However, during the transfer a portion of the system server is dedicated to the data transfer and thus unavailable for other networking tasks. Moreover, as the number of endpoints which must be simultaneously serviced by the bulk data distribution increases, network bandwidth demands are concomitantly increased. This complicates scalability of the bulk distribution systems.

Therefore, a need exists in the art for a bulk distribution mechanism that can transfer large amounts of data between network connected subsystems (or nodes) while maintaining scalability. Additionally, there is a need in such distribution mechanisms for methods and apparatus to distribute bulk data to a multiplicity of endpoints and to collect bulk data, including large log files, from the endpoints.

SUMMARY OF THE INVENTION

The aforementioned needs are addressed by the present invention. Accordingly, the present invention provides a general service that allows applications to asynchronously distribute large amounts of data from a source node, to multiple destination nodes, to process the data on each destination node, and then to collect the results on one or more "report-to" nodes.

The present invention includes fan-out nodes (which will also be referred to as repeaters) and methods therefor, which are nodes on the network which receive bulk data streams, and retransmit the data to the follow-on fan-out nodes or to endpoints. Additionally, the fan-out nodes receive bulk results from downstream and retransmit them to upstream fan-out nodes or final report-to nodes.

Additionally, the present invention includes a method and apparatus for enqueuing the distribution information received from a requesting application in a persistent queue at the repeaters according to its priority, and returns to the application and unique ID that can be used as a correlator for the results.

The invention also provides for a different maximum number of available sessions according to a predetermined set of selectable transmission priority levels. A distribution with a given priority level can use the number of sessions reserved for its priority level plus any sessions allocated for lower priority levels.

The foregoing has outlined rather broadly the features and technical advantages of the present invention in order that the detailed description of the invention that follows may be better understood. Additional features and advantages of the invention will be described hereinafter which form the subject of the claims of the invention. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention is a method and apparatus for distributing and collecting data between an originating source system and a plurality of endpoint systems (which may also be referred to as "endpoint nodes" or simply "endpoints"). The method and apparatus provide a general service that allows applications to asynchronously distribute large amounts of data from a source node to multiple destination nodes, to process the data on each destination node, and then to collect the results of that processing on one or more report-to nodes.

According to the principles of the present invention, the present invention has an originating source system followed by repeaters. The use of repeaters allows data to be delivered essentially simultaneously to a large number of machines. The present invention can be scaled to handle more destinations by adding repeaters. In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

A more detailed description of the implementation of the present invention will subsequently be provided. Prior to that discussion, an environment in which the present invention may be implemented will be described in greater detail.

Figure 1:
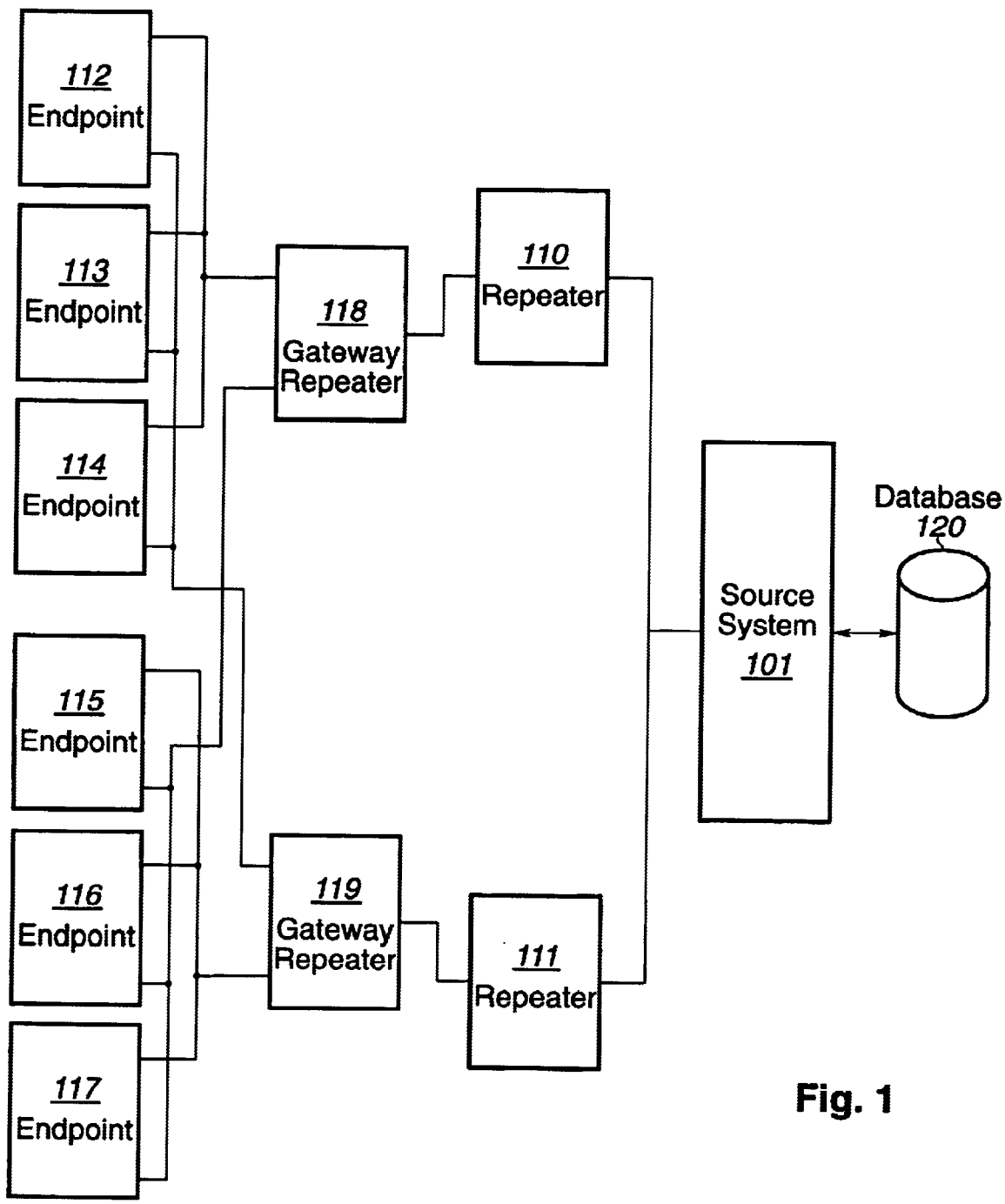
FIG. 1 illustrates, in block diagram form, a data processing network in accordance with one embodiment of the present invention.

FIG. 1 illustrates a communications network 100. The subsequent discussion and description of FIG. 1 are provided to illustrate an exemplary environment used by the present invention.

The network system 100 includes source system 101, one or more fan-out or, repeaters 110, 111, 118, 119, and a plurality of endpoints 112–117. Additionally, certain repeaters, such as 118 and 119, are directly connected to one or more endpoints, in the exemplary embodiment of FIG. 1, endpoints 112–114 or 115–117, respectively, and may be referred to as "gateway" repeaters (or, simply, "gateways").

Source system 101 provides distribution services with respect to resources 112–117. Note that source system 101 and endpoints 112–117 interfaces to repeaters 110 and 111 using the same methodologies as repeaters 110 and 111 interface with, for example, repeaters 118 and 119. Viewed logically, source system 101 and endpoints 112–117 each may include a "repeater". In other words, as an artisan of ordinary skill would recognize, as used herein, a repeater may be a logical element, that may be, but is not necessarily associated with a physical stand-alone hardware device in network 100. Repeater 110 may be the primary repeater through which resources 112–114 receive their data transfers, and repeater 111, likewise, may primarily service endpoints 115–117. Additionally, any report-back of successful transfers will be transmitted primarily via the endpoints primary domain except as explained below. It would be understood by an artisan of ordinary skill that additional repeaters may be inserted into the network and may be arranged in a multi-level hierarchy according to the demands imposed by the network size.

Gateway repeaters 118 and 119 are such repeaters in the exemplary embodiment of FIG. 1.

Figure 6:
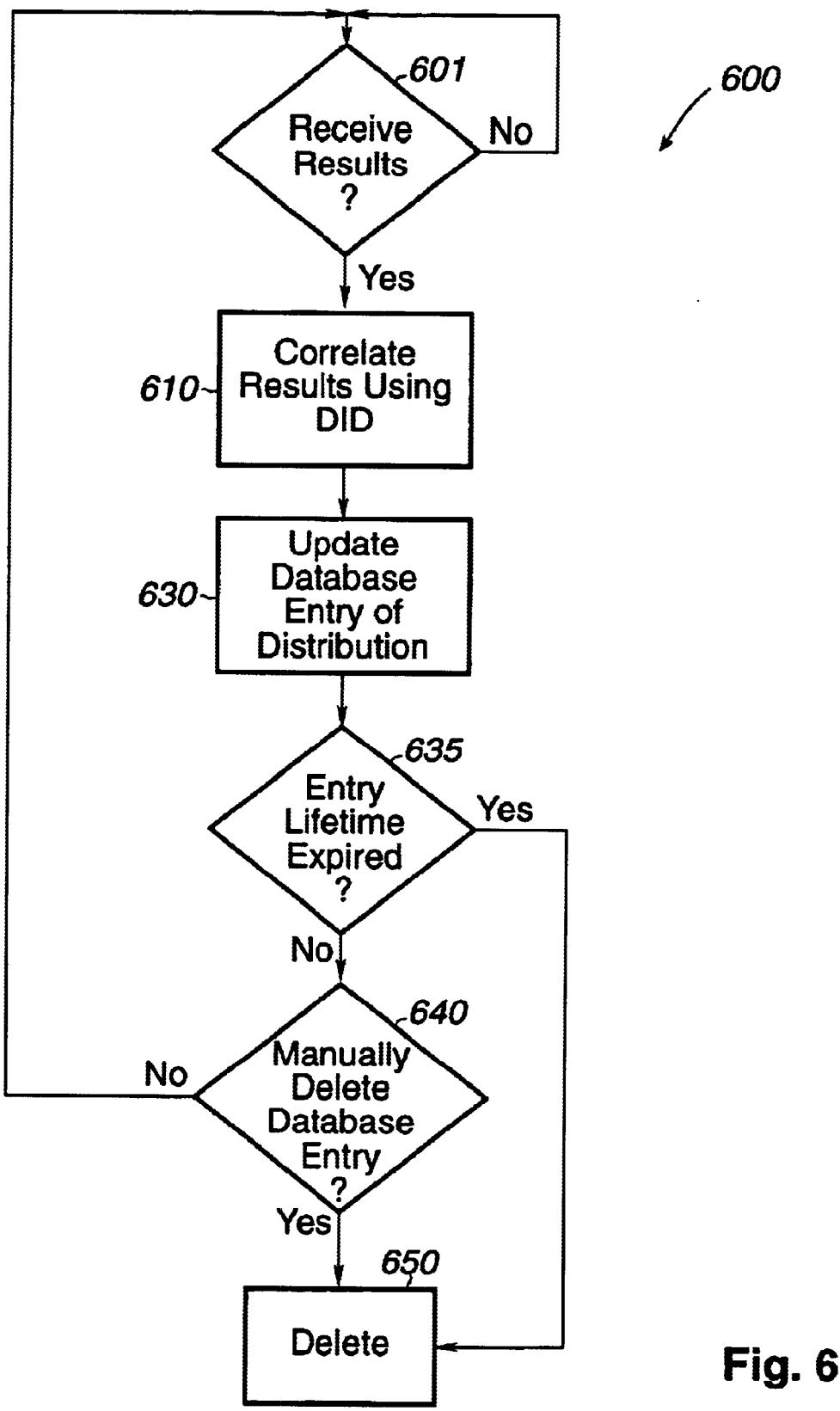
FIG. 6 illustrates in flowchart form, a database management methodology implemented in accordance with an embodiment of the present invention.

However, network system 100 may provide cross connections in order to provide redundant, parallel communication paths should the primary communication path to the endpoint become unavailable. For example, in FIG. 1, endpoint 114 has a primary pathway to source system 101 through repeaters 118 and 110. (A source system, such as source system 101 may also be referred to as a source node.) Should repeater 110 become unavailable, source system 101 can transfer bulk data to endpoint 114 via an alternative pathway through repeaters 118 and 111. Additionally, should repeater 118 become unavailable, endpoint 114 may receive data via repeaters 111 and 119. Source system 101 maintains database 120 for storing information used in managing a data distribution. A methodology which may be used to process the information to be stored in database 120 will be described in conjunction with FIG. 6.

Figure 2:
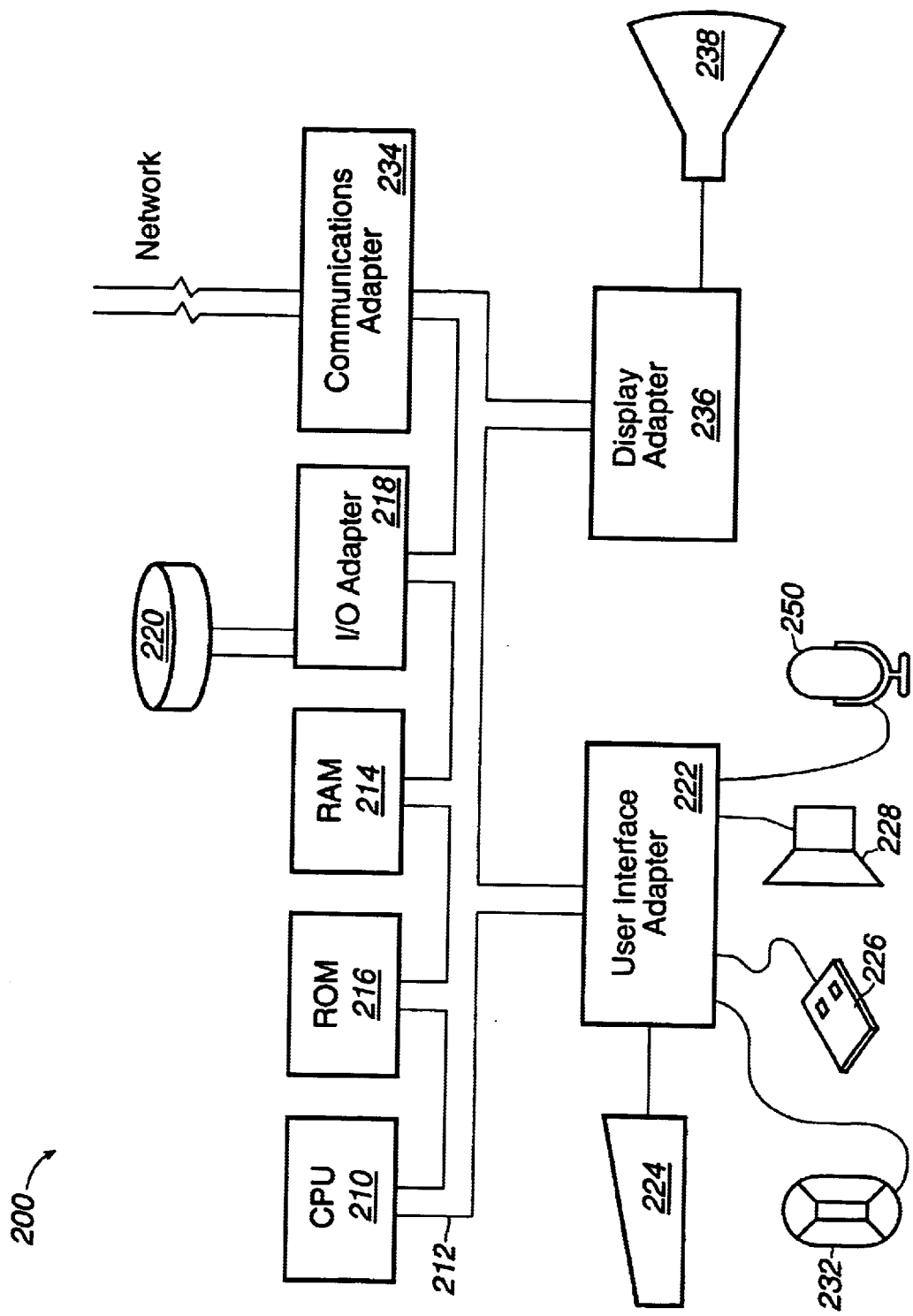
FIG. 2 illustrates, in block diagram form, a data processing system implemented in accordance with an embodiment of the present invention.

Referring next to FIG. 2, an example is shown of a data processing system 200 which may be used to implement a source system such as system 101, repeaters, such as repeaters 110, 111, 118, or 119 or endpoints, such as endpoints 112–117, executing the methodology of the present invention. The system has a central processing unit (CPU) 210, which is coupled to various other components by system bus 212. Read only memory ("ROM") 216 is coupled to the system bus 212 and includes a basic input/output system ("BIOS") that controls certain basic functions of the data processing system 200. Random access memory ("RAM") 214, I/O adapter 218, and communications adapter 234 are also coupled to the system bus 212. I/O adapter 218 may be a small computer system interface ("SCSI") adapter that communicates with a disk storage device 220. Disk storage device 220 may be used to hold database 120, FIG. 1. Communications adapter 234 interconnects bus 212 with the network as well as outside networks enabling the data processing system to communicate with other such systems. Input/Output devices are also connected to system bus 212 via user interface adapter 222 and display adapter 236. Keyboard 224, track ball 232, mouse 226 and speaker 228 are all interconnected to bus 212 via user interface adapter 222. Display monitor 238 is connected to system bus 212 by display adapter 236. In this manner, a user is capable of inputting to the system throughout the keyboard 224, trackball 232, mouse 226, or microphone 250 and receiving output from the system via speaker 228 and display 238.

Preferred implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 3A:
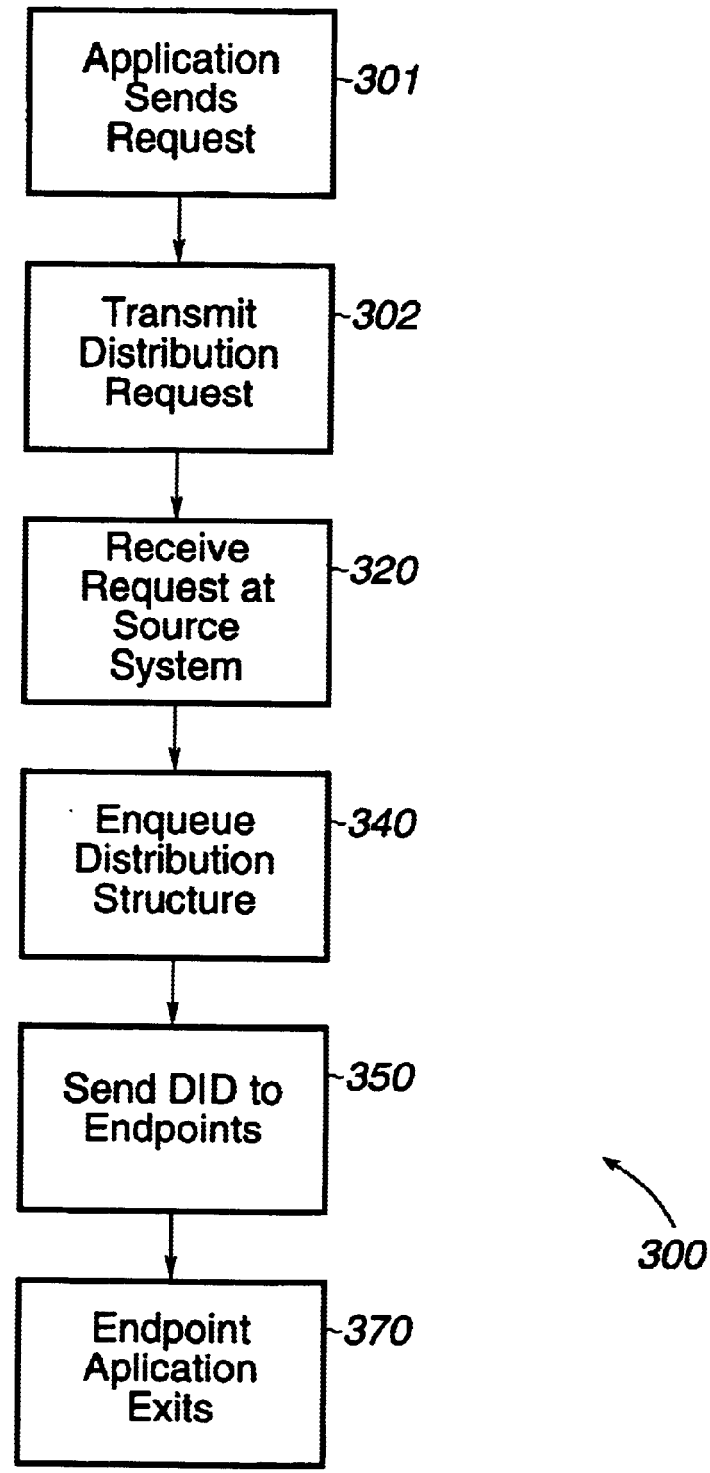
FIG. 3A illustrates, in flowchart form, a distribution request methodology in accordance with an embodiment of the present invention.

Refer now to FIG. 3A in which is illustrated a flow chart of a methodology 300 for processing distribution requests in accordance with an embodiment of the present invention.

Applications resident on endpoint systems may request a distribution of bulk data. The application may, for example, maintain a periodic update schedule, or respond to a user update request. When an application requires updating, or the application otherwise requires a distribution of data, the application requests the data from the source system, step 301. The source system may be a server, such as server 110, FIG. 1.

Figure 3B:
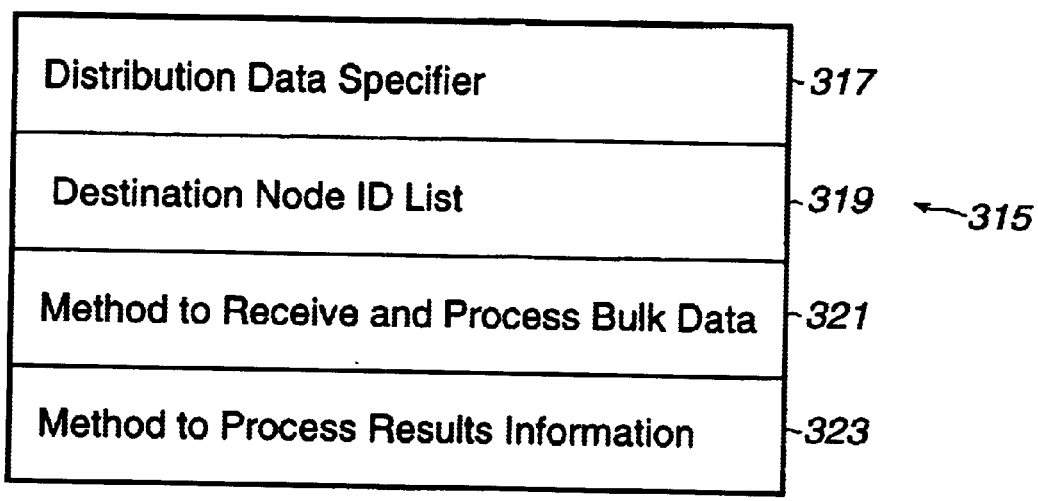
FIG. 3B illustrates, in tabular form, a distribution structure in accordance with an embodiment of the present invention.

Applications may submit a request by involving a predetermined method which is included in each repeater. In step 302, the request may be transmitted to the source system via one or more repeaters in similar fashion. The distribution request may be encapsulated in a data structure, which my be passed to the method. A data structure 315 which may be used in the present invention is schematically shown in FIG. 3B. Data structure 315 includes entries 317, 319, 321 and 323. These entries respectively include a distribution data specifier which identifies the data to be distributed in response to the request and the location of the data, a list of destination node identifiers (IDs) that specify the endpoints that are to receive the data, the method on the endpoint that will receive and process the data, and the method that will receive and process results information from each endpoint node receiving the distribution. The method identifier in field 321 informs the source system of the method on the endpoint system to be invoked to receive and process the data. As described further below, endpoints provide result information to the source system. The method identifier in field 323 informs the source system of the method on the source system that a repeater will invoke to receive and process the result information sent by the endpoint. In an embodiment of the present invention, this method may be implemented in accordance with the Common Object Request Broker Architecture (CORBA). The CORBA is specified in "The Common Object Request Broker: Architecture and Specification," Version 2.3, June 1999, which is hereby incorporated herein by reference.

In step 320, the request is received by the source system, and, in step 340, the source system enqueues the distribution information from the distribution structure in a database, such as database 120, FIG. 1. The distribution information is enqueued in accordance with a preselected distribution priority which may, in an embodiment of the present invention, be one of three levels: high, medium, or low. The use of the priority schedule in transferring data is discussed in detail in conjunction with FIGS. 4A, 4B and 5.

The source system provides the target endpoint(s) a distribution identification (DID) in step 350. The DID is used by the endpoints receiving the distribution to tag the results information, whereby the source system may correlate the results information when it is received from the endpoints. Additionally, the DID is used by the endpoints to check the data transmission as it is occurring as discussed in more detail in the co-pending commonly-owned U.S. Patent Application entitled "Apparatus for Restarting Interrupted Data Transfer and Method Therefor," incorporated herein by reference. The application can exit to allow the server and endpoints to perform other operations, step 370. The supplied notification method will be called by the source system to receive results information sent from each endpoint node. The distribution of the data is described in FIG. 4A and FIG. 4B.

Figure 4A:
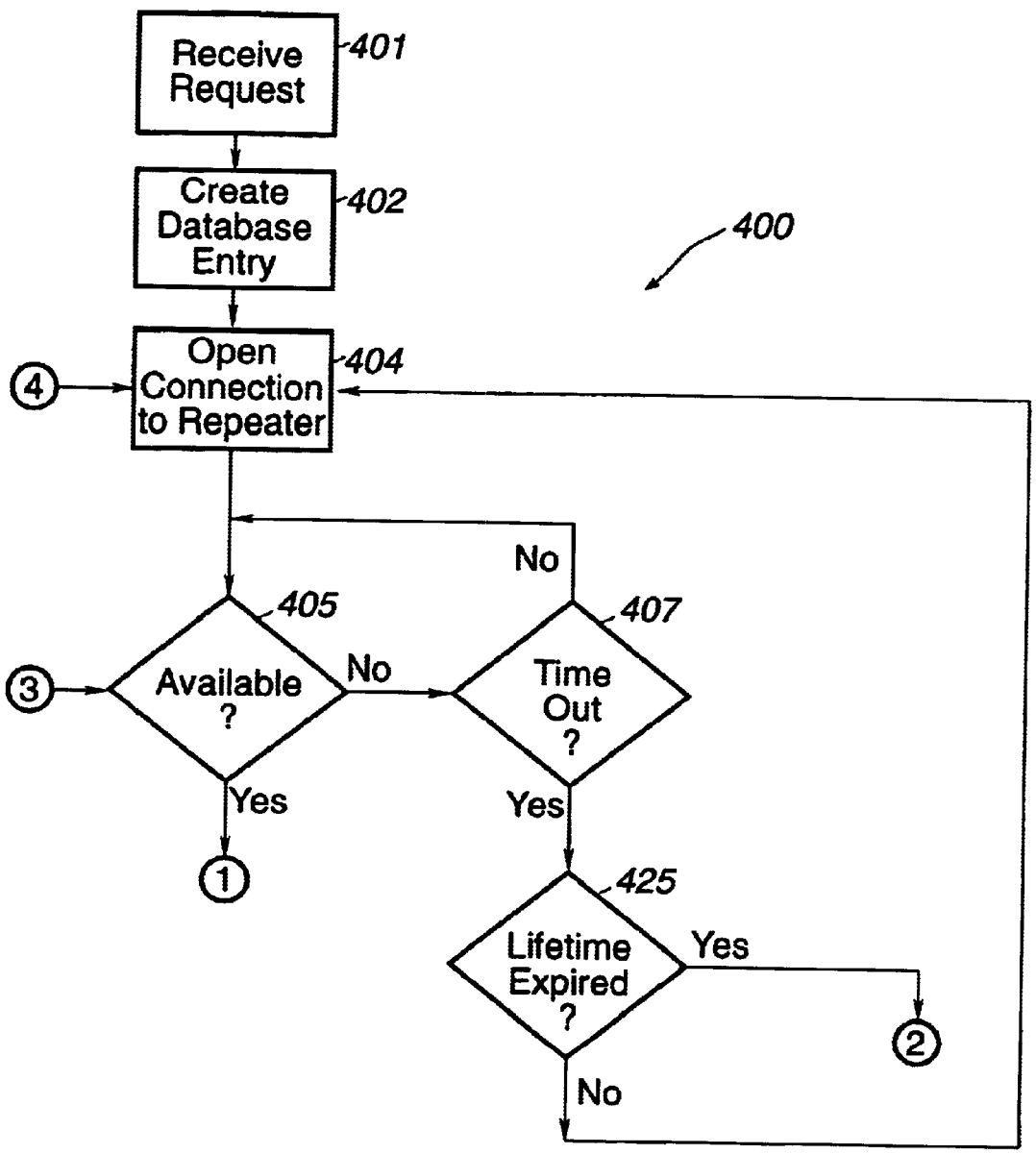
FIG. 4A illustrates, in flowchart form, a methodology to transfer data in accordance with an embodiment of the present invention.
Figure 4B:
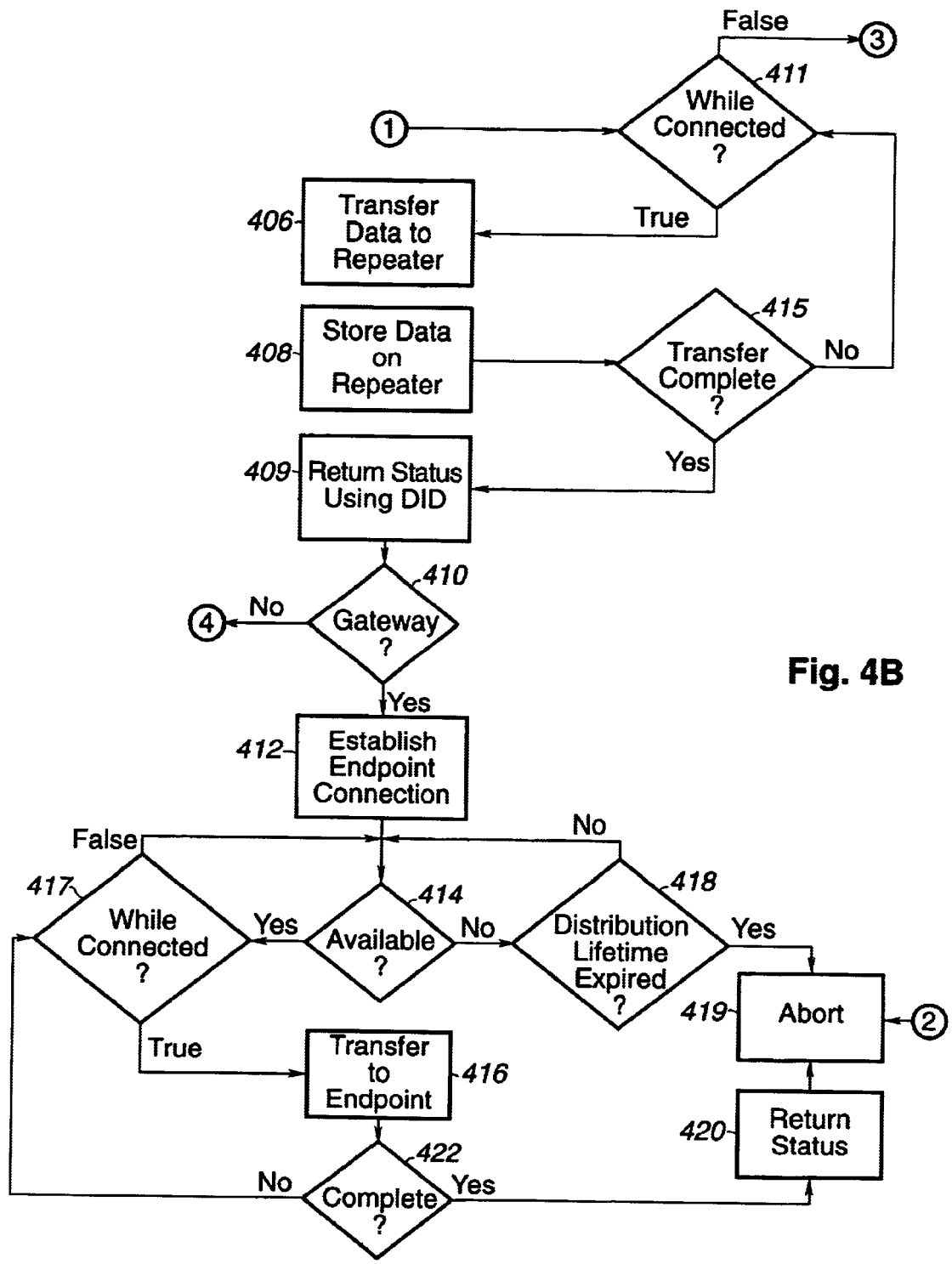
FIG. 4B is a continuation of FIG. 4A and illustrates, in flowchart form, a methodology to transfer data over a network in accordance with an embodiment of the present invention.

Refer now to FIG. 4A and FIG. 4B in which is illustrated a flow chart of methodology 400 for distributing and collecting bulk data between data processing systems. Methodology 400 may be implemented by a data processing network such as network 100, FIG. 1.

In step 401, data for distribution is loaded on to the source system, for example source system 101, FIG. 1. The administrator may allocate the appropriate endpoints to receive the data. Or, as described above, the appropriate endpoints may request the distribution based on applications running on the endpoints. Status information regarding the distribution is retained in a database which, in an embodiment of the present invention, may be maintained by the source system, such as source system 101, FIG. 1, as previously described. In step 402, a database entry corresponding to the distribution loaded in step 401 is created. If the system administrator has identified target endpoints, these are stored in the database entry, which will incorporate status information for each distribution endpoint. Additionally, endpoint destinations identified in distribution requests as described above in conjunction with FIG. 3 will also be incorporated in the database entry for the distribution. In an embodiment of the present invention, employing a network such as network 100, FIG. 1, the database entry may be included in database 120 maintained by source system 101.

In step 404, a connection is opened to a target repeater. The target repeater may be a gateway repeater, as discussed below in conjunction with step 410, or may be an intermediate repeater for fanning out the distribution to one or more gateways. In step 405, it is determined if a session is available. Network bandwidth management is implemented by allocating resources (referred to as sessions) for transferring data in accordance with a priority scheme in which a particular distribution is assigned one of a predetermined set of priority levels. A method and apparatus for connection management is described in detail in the corresponding commonly owned U.S. Patent Application entitled "An Apparatus for Connection Management and Method Therefor," incorporated herein by reference. For each priority level a predetermined "pool" of resources, or sessions, for transferring data, is allocated and a distribution may use a session from the pool corresponding to the priority level of the distribution or from a lower priority level pool. That is, high priority pool may have j sessions allocated, a medium priority pool may have b sessions and a low priority pool may have l sessions. The availability of a session is determined based on the available bandwidth and the priority level of the distribution as described in detail in conjunction with FIG. 5. If in step 405 a connection is available, while the connection is established, step 411, data is transferred to the repeater, in step 406. The transfer data is stored on the repeater, step 408. The storage may be temporary or permanent in accordance with an explicit administrator command, or control information provided by an application requesting the distribution. The storage, or depoting, of data on a repeater is described in detail in the co-pending, commonly owned U.S. Patent Application entitled, "Apparatus for Data Depoting and Method Therefor," and incorporated herein by reference.

In step 415, it is determined if all of the data constituting the distribution has been transferred. If not, methodology 400 returns to step 411, and data transfer continues by following the "True" branch to step 406, provided the connection has not failed.

If the connection has failed, methodology 400 returns to step 405. Methodology 400 then loops between steps 405 and 407, where, in step 407 it is determined if a preselected amount of time has elapsed until, in step 405, the connection has become available.

If, in step 407, the preselected time interval has elapsed, which may be referred to as "timing out," it is then determined, in step 425, if a preselected distribution lifetime has expired. If, in step 425, the distribution lifetime has not expired, then methodology 400 proceeds to step 404 to open a connection to an alternative repeater, wherein methodology 400 then performs step 405 to determine the availability of a connection to the alternative repeater, in the same fashion as discussed above. Recall, as discussed hereinabove in conjunction with FIG. 1, a network in accordance with an embodiment of the present invention may include a plurality of parallel repeater paths between the distribution source system and the target endpoints. However, in an alternative embodiment of the present invention, the network, may not implement parallel paths, and in such an alternative embodiment, in steps 404 and 405, the connection is retried to the same target.

A method and apparatus for connection management which may be used to implement steps 404–415 is described in the commonly owned, co-pending U.S. Patent Application entitled "Apparatus for Connection Management and Method Therefor" incorporated herein by reference.

If, however, in step 425 the distribution lifetime has expired, the distribution is aborted, step 419. In step 420, the status of the distribution, which is included in the results information associated with the distribution, is returned to the source system, or other preselected "report-to" systems which may include an endpoint system running the application requesting the distribution.

Returning to step 405, if a connection is reestablished before the timeout period has elapsed, methodology 400 proceeds by the "Yes" branch to step 411 and then to step 406 to transfer additional data. The data transfer may resume at a preselected checkpoint wherein the storage of data, in step 408, is periodically committed to a nonvolatile storage medium, for example a disk storage device 220, FIG. 2. The transfer of data, in step 406, may then resume subsequent to the last permanently stored data. Such a data transfer using preselected checkpoints to resume interrupted data transfers is described in detail in the commonly owned, co-pending U.S. Patent Application entitled, "Apparatus for Reliably Restarting Interrupted Data Transfer and Method Therefor" incorporated herein by reference.

Methodology 400 loops between steps 404–408, 411, 415, and 425 until the full distribution is transferred, or the distribution aborts in step 420. When the transfer completes as determined in step 415, methodology 400 then proceeds to step 409 and returns status information to one or more "report-to" machines as previously discussed in conjunction with step 420. The status may be sent to the endpoint requesting a distribution using the DID provided as described in conjunction with step 315, FIG. 3, above.

In step 410 it is determined if the current repeater is a gateway. If so, in step 412 a connection to the endpoints receiving the distribution is established. In step 414, it is determined if the connection is available. Again, as discussed hereinabove in conjunction with step 405, a preselected number of connections may be available in accordance with a priority scheme. If a connection is not available, methodology 400 proceeds through steps 414 and 418 until a connection is established, or in step 418, the distribution lifetime expires, wherein the distribution aborts in step 419, and the distribution status is returned in step 420, as previously described.

If, however, in step 414, a connection at the requested priority is available, while the connection is established, in step 417, data is transferred to the endpoint, step 416. Transfer continues, while, in step 422, the complete distribution has not been transferred, in which case the methodology 400 loops between steps 414, 417, 418, 416 and 422. The aforementioned method and apparatus for connection management described is the co-pending, commonly owned U.S. Patent Application entitled "Apparatus for Connection Management and Method Therefor, incorporated herein by reference, may be used to implement steps 412–418.

The data transfer in steps 416 may occur using the checkpoint process previously discussed in conjunction with the data transfer between repeaters, step 406, and described in detail in the co-pending, commonly owned U.S. Patent Applicant entitled "Apparatus for Data Depoting and Method Therefor," incorporated herein by reference. On completion of the transfer, step 422, status is returned in step 420 to one or more report-to systems.

Methodology 400 may also be used to return distribution results information to the report-to systems. In using methodology 400 in this way, the report-to systems play the role of endpoint systems with respect to data distributions, and each endpoint receiving or repeater relaying the distribution data play the role of source systems. In this way, for example, log files generated by an installation program may be returned to a preselected report-to system. Otherwise, as would be recognized by an artisan of ordinary skill, FIG. 4 is unchanged.

Figure 5:
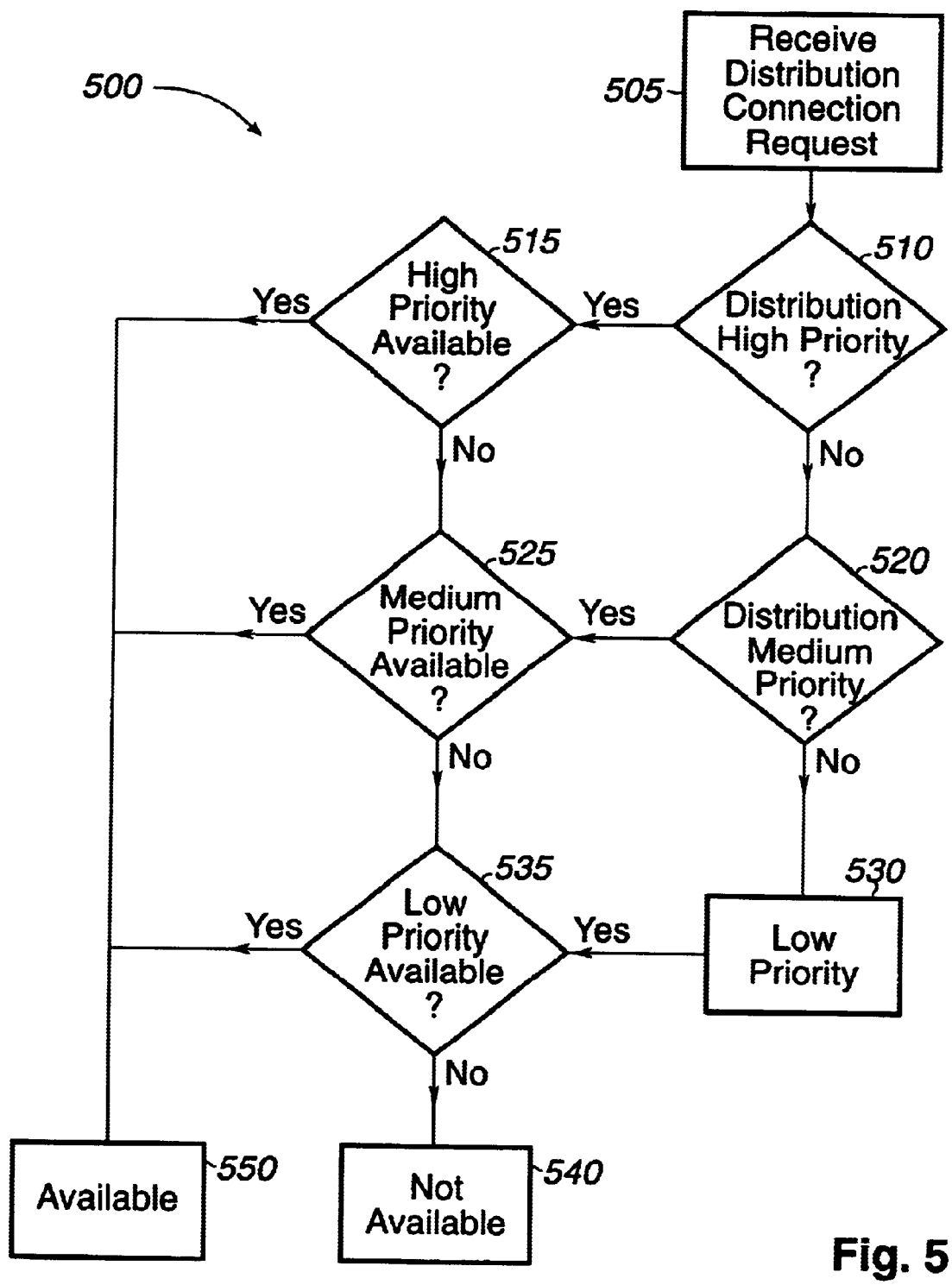
FIG. 5 illustrates, in flowchart form, a methodology implemented to determine priority resource availability in accordance with an embodiment of the present invention.

A methodology for opening connections in accordance with a preselected distribution priority level which may be used in conjunction with steps 404 and 405, and 412 and 414 of methodology 400 will now be described. FIG. 5 illustrates, in flowchart form, a methodology 500 for performing a session availability determination in accordance with an embodiment of the present invention.

In step 505, a session request is received, for example, from methodology 400, FIG. 4 when opening a connection. A particular distribution in an embodiment of the present invention may be assigned one of three priority levels, low, medium or high, which determines the order in which the distribution is handled by a repeater. Distributions with higher priority levels are handled before those with lower priority, and distributions with the same priority level are handled in the order in which they are received by the repeater. The priority level may be set by an application requesting the distribution. A default priority may be set at the source repeater when it receives a distribution request from an application.

In step 515, it is determined if the distribution has a high priority level. If not, then in step 520, it is determined if the distribution has a medium priority level. If not, then the distribution has a low priority, step 530 and, in step 535, it is determined if a session is available in the low-priority pool. If low priority session is available, then in step 550, methodology 500 signals that a connection is available. In an embodiment of the present invention in accordance with methodology 400, FIGS. 4A and 4B, the information from step 550 may be received in steps 405 and 414 in response to the opening of connections in steps 404 and 412, respectively. Conversely, if no low priority sessions are available in step 535, in step 540 methodology 500 signals that no session is available.

Returning to step 510, if the data transfer is determined to be a high priority transfer, then in step 515 it is determined if a high priority session is available. If so, then methodology 500 proceeds to step 550. Otherwise, if high priority sessions are unavailable, that is, fully used by other distributions, then in step 525 it is determined if a medium priority session is available. Again, if a medium priority session is available, then step 550 is performed; otherwise, in step 535, it is determined if a low priority level session is available. If so, step 535, then step 550 is performed; otherwise, no sessions are available and methodology 500 proceeds to step 540.

Similarly, if in step 510, it has been determined that the distribution is not a high priority distribution, it is determined if the distribution has a medium priority, step 520. If not, it must again be a low priority distribution, step 530, previously described. Otherwise, in step 520 it is a medium priority distribution, and in step 525 it is determined if a medium priority session is available. As before, if no medium priority sessions are available, it is determined if a low priority session is available, step 535. In this manner, a data distribution with a given priority level can use the number of sessions reserved for its priority level plus any sessions allocated to lower priority levels. If no sessions are available at the assigned priority or lower, the methodology signals no available sessions, step 540, as previously described.

Methodology 500 overcomes the tasking conflicts that might arise when a repeater is processing a lower priority distribution and a higher priority distribution is received. Without the ability to specify priority sessions, the high priority distribution would have to wait until the lower priority distribution was complete, or alternatively, the lower priority distribution be interrupted, causing inefficiencies within the distribution system, by having to subsequently re-distribute the lower priority distribution.

As discussed hereinabove, in conjunction with, for example, FIG. 4, results reports are generated by repeaters and endpoints reporting status of the transfer of a data distribution. Results are sent to one or more "report-to" machines, which may include the distribution source system. Results are stored in the distribution database, such as database 120 in FIG. 1, maintained by the distribution manager, and may be entered into the database in conjunction with methodology 600, FIG. 6. In step 601, methodology 600 loops until results are received. Results received are correlated in step 610 using the DID, which may be provided in accordance with methodology 300 for processing distribution requests, FIG. 3. Recall that distributions may be sent to a plurality of endpoints, each of which may be reached via a different sequence of repeaters, as discussed hereinabove in conjunction with FIG. 1. Thus, results for a particular distribution may be forwarded to the "report-to" machines from several endpoints at different times. The DID, which is unique to the particular distribution, then allows the results associated with that distribution to be correlated for updating the database entry corresponding to the distribution, in step 630. In this way, the distribution manager maintains a current status for each distribution.

To avoid indefinitely filling the database, distribution records can be deleted. Automatic deletion may be provided after the expiration of a preselected record lifetime. In step 635, if the entry lifetime has expired, the corresponding entry is deleted in step 650. Even if, however, the entry lifetime has not expired, the entry may be deleted manually. In step 640, it is determined if a system administrator has initiated a command to delete an entry. If so, the entry is, again, deleted in step 650. Otherwise, methodology 600 returns to step 601 to continue to receive distribution results.

The foregoing has outlined rather broadly the features and technical advantages of the present invention in order that the detailed description of the invention that follows may be better understood. Additional features and advantages of the invention will be described hereinafter which form the subject of the claims of the invention.

What is claimed is:

1. A data processing system for bulk data transfer comprising:

a source data processing system for distributing data to one or more target data processing systems wherein after an interruption of distributing said data, distributing said data may be restarted at a checkpoint; and one or more fan-out nodes for transferring said data between said source system and each of said one or more target data processing systems and transferring result information between said one or more target data processing systems and a preselected set of one or more data processing systems for managing data distributions.

2. The system of claim 1 wherein each of said one or more fan-out nodes is operable for caching at least a portion of a data distribution and at least a portion of said result information.

3. The system of claim 1 wherein a data distribution has a preselected priority, said preselected priority operable for determining an availability of resources for said transferring of said data and said transferring of said result information.

4. The system of claim 1 wherein said one or more fan-out nodes comprises a plurality of fan-out nodes, and wherein said transferring of said data comprises:

receiving said data from said source data processing system by a first fan-out node;

sending said data to a second fan-out node; and sending said data from said second fan-out node to one or more of said target data processing systems.

5. The system of claim 1 wherein source data processing system distributes said data in response to a request from at least one of said target data processing systems.

6. The system of claim 5 wherein a preselected one of said one or more data processing systems for managing data distributions enqueues said request in a database.

7. The system of claim 6 wherein said request comprises:

a list of target data processing systems to receive the data;

an identifier of a method by which the target machines will receive and process the data; and an identifier of a notification method by which said result information from each endpoint system will be received by said preselected set of one or more data processing systems for managing data distributions.

8. The system of claim 6 wherein said request is assigned a preselected distribution priority and said request is enqueued in accordance with said preselected distribution priority.

9. A method for distributing data comprising the steps of:

transferring said data via a first set of one or more fan-out nodes to one or more endpoint systems wherein after an interruption of transferring said data, transferring said data may be restarted at a checkpoint; and transferring results information via a second set of said one or more fan-out nodes from said one or more endpoint systems to a preselected set of one or more data processing systems for managing data distributions, said results information generated in response to said step of transferring said data.

10. The method of claim 9 wherein each of said one or more fan-out nodes is operable for caching at least a portion of a data distribution and at least a portion of said result information.

11. The method of claim 10 further comprising the steps of:

assigning one of a preselected set of priority values to each data distribution; and determining an availability of a network connection for said step of transferring said data in response to said one of said preselected set of priority values.

12. The method of claim 11 further comprising the step of determining an availability of a network connection for said transferring of results information in response to said one of said preselected set of priority values.

13. The method of claim 11 further comprising the steps of:

assigning a distribution lifetime value to each data distribution; and aborting said step of transferring said data in response to an unavailability of said connection for a time interval corresponding to said distribution lifetime.

14. The method of claim 9 wherein said step of transferring said data is performed in response to a request received from at application on at least one of said plurality of endpoints.

15. The method of claim 14 wherein said request includes:

a list of target data processing systems to receive the data;

an identifier of a method by which the target machines will receive and process the data; and an identifier of a notification method by which said result information from each endpoint system will be received by said preselected set of one or more data processing systems for managing data distributions.

16. A computer program product embodied in a machine readable storage medium, the program product including programming for distributing data comprising instructions for:

transferring said data via a first set of one or more fan-out nodes to one or more endpoint systems wherein after an interruption of transferring said data, transferring said data may be restarted at a checkpoint; and transferring results information via a second set of said one or more fan-out nodes from said one or more endpoint systems to a preselected set of one or more data processing systems for managing data distributions, said results information generated in response to said step of transferring said data.

17. The program product of claim 16 wherein each of said one or more fan-out nodes is operable for caching at least a portion of a data distribution and at least a portion of said result information.

18. The program product of claim 17 further comprising instruction for:

assigning one of a preselected set of priority values to each data distribution; and determining an availability of a network connection for said step of transferring said data in response to said one of said preselected set of priority values.

19. The program product of claim 18 further comprising instructions for determining an availability of a network connection for said transferring of results information in response to said one of said preselected set of priority values.

20. The program product of claim 18 further comprising instructions for:

assigning a distribution lifetime value to each data distribution; and aborting said step of transferring said data in response to an unavailability of said connection for a time interval corresponding to said distribution lifetime.

21. The program product of claim 16 wherein said instructions for transferring said data are performed in response to a request received from at application on at least one of said plurality of endpoints.

22. The program product of claim 21 wherein said request includes:

a list of target data processing systems to receive the data;

an identifier of a method by which the target machines will receive and process the data; and an identifier of a notification method by which said result information from each endpoint system will be received by said preselected set of one or more data processing systems for managing data distributions.

\* \* \* \* \*